April 7, 1959 B. ALEXANDER 2,881,331

MAGNETIC SWITCHING CIRCUIT

Filed May 23, 1957

Inventor
BEN ALEXANDER

By [signature]
Attorney 2,881,331

MAGNETIC SWITCHING CIRCUIT

Ben Alexander, Nutley, N.J., assignor to International Telephone and Telegraph Corporation, Nutley, N.J., a corporation of Maryland Application May 23, 1957, Serial No. 661,111

4 Claims. (Cl. 307—88)

This invention relates to magnetic switches and more particularly to a magnetic switching circuit having a substantially infinite signal-to-noise ratio.

Magnetic cores with rectangular hysteresis loops have the inherent storage and switching characteristics required for memory systems. These cores have two or more possible physical stable states, and it is possible to change these states by the application of several input signals. Readout of the desired information is obtained from an output winding. Unwanted voltages are produced in the readout or output winding when the core is driven in the positive interrogating direction. They are due in part to the small change of flux in the selected core, but mostly to the additive effects of the changes of flux in other unselected cores of the memory system which are partially excited when common switching or inhibiting windings are used. There are systems which increase the signal-to-noise ratio by using a readout winding in which the direction of linkage changes polarity at every core on every line where the cores are arranged in checker-board fashion. With this arrangement the unwanted voltages from unselected cores tend to cancel each other except for two cores on the selected line. The signal-to-noise ratio of this system is high. However, with large numbers of these cores being used in memory systems, there may be need for a magnetic switching circuit having an extremely high signal-to-noise ratio.

It is, therefore, an object of this invention to provide a magnetic switching circuit having a substantially infinite signal-to-noise ratio.

A feature of this invention is a magnetic switching circuit comprising a magnetic core and three coils for example inductively coupled to the core, a first coil to which is applied a pedestal pulse of a positive polarity to drive the core to the positive magnetic saturation state, a second coil which is an output winding and to which is applied a clock pulse consisting of negative and positive polarity voltages, a third coil to which is fed a negative pulse to drive the core to the negative magnetic saturation state, a negative bias voltage applied to the output of the second coil, and rectifier means coupled to the output of the second coil, whereby the simultaneous application of the pedestal pulse and the clock pulse when the core is in the positive residual magnetic state will produce as the output of the rectifier the positive portion of the clock pulse less the amplitude of the negative bias voltage.

Another feature is that the simultaneous application of the pedestal pulse and the clock pulse when the core is in the negative residual magnetic state will drive the core to the positive magnetic saturation state with no pulse appearing at the output terminal of the rectifier.

These and other objects and features of this invention and the manner of attaining them will become more apparent and the invention itself will be best understood by reference to the following description of an embodiment of the invention taken in conjunction with the accompanying drawings, wherein.

Figure 1:
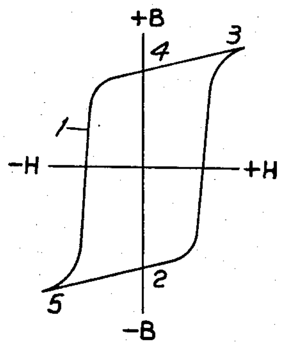
Fig. 1 is the hysteresis loop of a magnetic material such as used in this invention.

Referring to Fig. 1, there is shown a representative hysteresis loop 1 for a magnetic core possessing substantially rectangular hysteresis loop properties. Points 2 and 4 are the states of maximum residual flux density, $-B_r$ and $+B_r$ which may also be called the negative and positive set states. Point 3 is the positive magnetic saturation state $+B_s$ and point 5 is the negative magnetic saturation state $-B_s$. The salient features of cores having the nearly rectangular hysteresis loop form is a ratio of $B_r$ to $B_s$ of approaching unity. The high value of residual inductance results in an inherent memory or switching characteristic. The core 1 can be switched from one set state to another by passing a suitable pulse of current through a set winding coupled to the core 1. If the core 1 is in the negative set state 2 and a positive magnetizing force of sufficient magnitude is applied to the core 1, the path followed is from 2 to 3. Upon removal of the current in the set winding, the magnetizing force H falls to zero and the dynamic path continues from 3 to 4, the positive set state. If a negative magnetizing force of sufficient magnitude is now applied to the set winding, the dynamic path is indicated by points 4 to 5. Again, upon removal of the negative magnetizing force, the core flux density B falls to 2, the negative set state. Once the core 1 is set to a given state of residual flux, it will remain in this state indefinitely, since for all practical purposes the state is independent of time and environmental conditions and can be shifted only by appropriate application of current in the set windings. To drive the core 1 from point 2 to point 3 requires a large change in flux, and a relatively small change in flux to go from point 4 to point 3.

Since the almost vertical sides of the hysteresis loop 1 indicate a very high slope or permeability, the inductance and theerfore the impedance of a winding coupled to the core and to which a voltage pulse is applied almost instantaneously reaches a very high value. The large change in voltage as the dynamic path is traversed from 2 to 3 induces a correspondingly large back electromotive force, which opposes the output voltage pulse of the winding. The characteristics of the core, then, will determine the winding impedance. At point 3 on the hysteresis loop 1, the flux change becomes zero, the winding impedance which is a function of the flux change also becomes zero and the winding looks truly like a short circuit.

Figure 2:
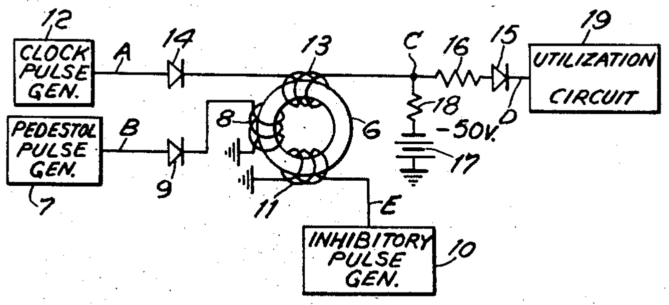
Fig. 2 is a circuit diagram of one embodiment of this invention.

Fig. 2 is the circuit embodiment of this invention wherein a toroidal magnetic core 6 has the rectangular hysteresis loop characteristic described above. A pedestal pulse generator 7 is coupled to a first winding 8 on core 6 by means of rectifier 9. An inhibitory pulse generator 10 is directly coupled to a second core winding 11. A clock pulse generator 12 is coupled to an output winding 13 by a rectifier 14. The output winding 13 is coupled to a rectifier 15 by resistor 16 and to a source of negative voltage 17 by means of a resistor 18. The output of the rectifier 15 is fed to a utilization circuit 19.

Figure 3:
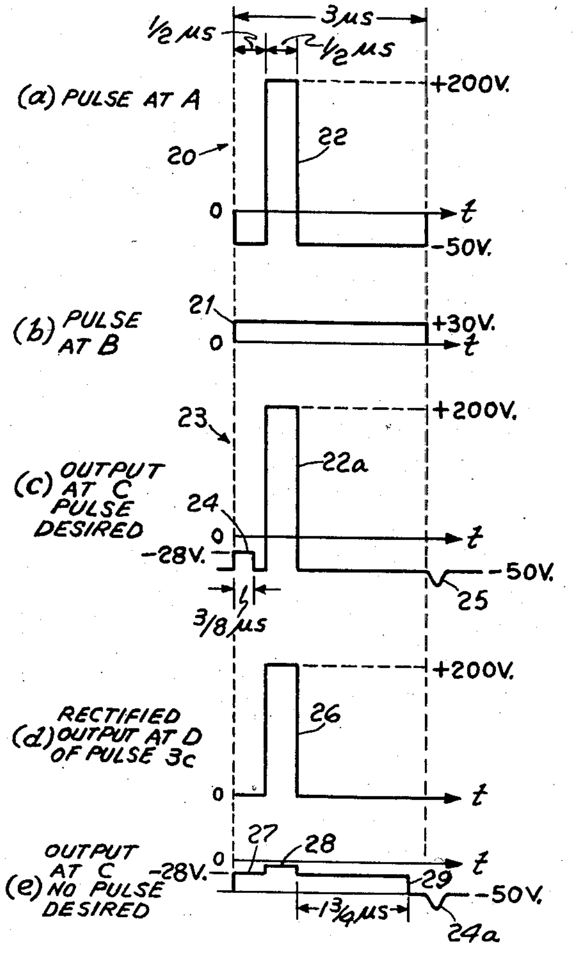
Fig. 3 shows the various pulses occurring at different points of the circuit of Fig. 2.

The operation of this circuit can be described with reference to the waveforms of Fig. 3. The clock generator 12 generates a pulse 20 as shown in Fig. 3*a*. The pulse 20 has a duration of 3 μsec. and consists of a negative pulse of —50 volts amplitude for ½ μsec., a positive pulse of 250 volts for ½ μsec., and, again, a negative pulse for the remaining 2 μsec. of —50 volts amplitude. The pedestal pulse generator 7 produces a positive pulse 21 of 30 volts amplitude and 3 μsec. duration, and in time coincidence with the clock pulse 20. The positive pedestal pulse 21 will pass through the rectifier 9 unchanged and appear in winding 8. The mixed polarity clock pulse 20 will emerge from the rectifier 14 devoid of its negative voltages and remaining only with its positive pulse portion 22 of 250 volts, which will energize the output winding 13. The bias voltage supplied by source 17 is set at —50 volts so that any induced voltage from the pedestal pulse 21 appearing in the output winding 13 will be insufficient to overcome the —50 volt bias. The core 6 characteristics are chosen so that the magnetic flux density required to bring the core 6 to the positive saturation state 3 from point 4 is 150 gausses and to bring the core 6 to the positive saturation state 3 from the negative residual state 2 will require 3150 gausses. The windings 8 and 13 with a turns ratio of approximately 30 to 22 are designed so that with the application of the appropriate current, the positive pulse portion 22 of the clock pulse 20 will provide 2100 gausses of magnetic flux and each ½ μsec. of the pedestal pulse 21 will provide 200 gausses of magnetic flux. When the core 6 is at the positive set state 4 and the clock pulse 20 and the pedestal pulse 21 are coincidentally applied, the pedestal pulse will energize the winding 8 and with 150 gausses drive the core 6 from point 4 to the positive saturation state 3. This will occur in ⅜ μsec. and will hold the core at the positive saturation state 3 until the expiration of the pedestal pulse. The output pulse 23, Fig. 3*c*, at point C, consists of a first portion 24 which is 22 volts induced in the winding 13 by the pedestal pulse 21. These 22 volts superimposed on the —50 volt bias at point C will produce a resultant —28 volts which will endure at that level for ⅜ μsec. and when the induced voltage ceases due to the core saturation and no further flux change, only the —50 volt bias level will appear for the next ⅛ μsec. At that time the positive 250 volt portion **22*a* of the clock pulse 20 which has passed through the rectifier 14 will appear at C superimposed on the —50 volt bias level. Because the 150 gausses produced by the ⅜ μsec. portion of the pedestal pulse has saturated the core, the impedance of the output winding 13 is zero and the whole of the positive portion 22 of the clock pulse 20 passes through the winding 13 with no attenuation. At the expiration of the ½ μsec. duration of the positive portion 22*a* clock pulse, the —50 volt bias again appears until the expiration of the pedestal pulse 21 and the clock pulse 20, when the core returns from positive saturation state 3 to positive residual state 4. The brief negative pulse 25 occurs because of the flux reversal from point 3 to point 4. The output of the rectifier 15** at point D is shown in Fig. 3*d* as the positive portion 26 above the zero voltage line of the pulse output 23. This positive pulse 26 can be used as desired in the utilization circuit 18 for information purposes.

If no pulse output at D is desired, the core 6 is reset to the negative residual state 2 by means of the negative pulse produced by the inhibitory pulse generator 10 and which may be of any value sufficient to drive the core 6 to the negative saturation state 5. Upon the cessation of the negative pulse the core 6 will go from negative saturation state 5 to negative residual state 2. The pedestal pulse 21 and the clock pulse 20 are coexistent. The first ½ μsec. of the positive pedestal pulse 21 will supply 200 gausses of magnetic flux density which is much too low to saturate the core. The positive portion 22 of the clock pulse 20 is now applied to the coil 19 but as the core 6 is positively unsaturated and the 2100 gausses of the positive portion clock pulse 22 plus the 200 gausses of the second ½ μsec. portion of pulse 21 still does not saturate the core 6 in a positive direction, the output winding 13 impedance is still at a maximum and attenuates the pulse 22 to a level which is insufficient to overcome the —50 volt bias at point C. This result is shown in Fig. 3*e* where the pulse 27 is the 22 volts induced in the output winding 13 by the pedestal pulse 21 and will appear at C. The pulse 28 is the attenuated pulse 22 and as it is below ground potential, no current will pass through the rectifier 15 into the utilization circuit 19. In the next 1¾ μsec. of the pedestal pulse 21 sufficient gausses have accumulated to drive the core 6 to the positive saturation state 3 at which point 29 in Fig. 3*e* the voltage induced in the output winding 13 by the pedestal pulse 21 vanishes. The —50 volt bias remains for the next ¼ μsec. when the pedestal pulse 21 and the clock pulse 20 cease, and the brief negative pulse **25*a* occurs, again because of the flux reversal from point 3 to point 4. At the positive set state 4, the core 6** is now ready for pulse transmission in the same manner as previously described.

It is evident that by judicious selection of the negative bias level at point C, the amplitude of the pedestal pulse 21 and the turns ratio of windings 8 and 13, the pedestal pulse voltage induced in the output winding 13 will not overcome the negative bias so that the voltage induced by the pedestal pulse 21 in winding 13 will always be below ground potential. Similarly, the proper choice of the core 6 to insure a winding impedance sufficient to attenuate the clock pulse to keep it below ground potential at point C when the core 6 is in the positively unsaturated state will insure that no unwanted signals due to the clock pulse 20 will appear at the rectifier output at D during that time.

Figure 4:
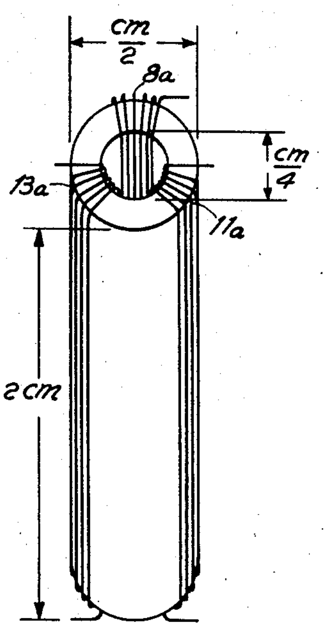
Fig. 4 is an isometric view of a magnetic core and the windings coupled thereto of this invention.

In a reduction to practice of this invention, a ferrite core of the configuration and dimensions shown in Fig. 4 has been selected as the correct core. The number of turns of the pedestal pulse winding **8*a* has been calculated to be 30, the number of turns of the clock pulse winding 13*a* to be 22 and both coils to be wound of No. 32 double Formex winding, and the clock pulse winding impedance is 5000 ohms. As heretofore explained, the inhibitory pulse coil 11*a* can have any number of turns adequate to provide the necessary flux to drive the core 6 from positive residual state 4 to negative saturation state 5. The bias resistor 18 should be 1000 ohms and the series resistor 16** should be 4000 ohms to control the pulse output current to be of the proper value.

While I have described above the principles of my invention in connection with specific apparatus, incorporating three coils wound on a common core, it is to be clearly understood that this specific apparatus is made only by way of example since two or more than three coils may be used without departing from the scope of my invention as set forth in the objects thereof and in the accompanying claims.

I claim:

1. A magnetic switching circuit having a substantially infinite signal-to-noise ratio comprising a core of magnetically permeable material having substantially rectangular hysteresis loop properties, a plurality of coils inductively coupled to said core, means coupled to at least one of said coils to apply a first pulse of a first polarity to said coil to drive said core to the magnetic saturation state of said first polarity, means coupled to at least a second one of said coils to apply a second pulse containing voltages of said first polarity and a second polarity, means coupled to the output of said second coil to apply thereon a voltage of said second polarity, rectifier means coupled to said output of said second coil whereby the simultaneous application of said first and second pulses in said first and second coils when said core is in the magnetic residual state of said first polarity will produce as the only output of said rectifier the first polarity portion of said second pulse less the voltage of said second polarity applied to said output of said second coil.

2. A magnetic switching circuit having a substantially infinite signal-to-noise ratio comprising a core of magnetically permeable material having substantially rectangular hysteresis loop properties, a plurality of coils inductively coupled to said core, means coupled to at least one of said coils to apply a first pulse of a first polarity in said coil to drive said core to the magnetic saturation state of said first polarity, means coupled to at least a second one of said coils to apply a second pulse containing voltages of said first polarity and a second polarity, means coupled to the output of said second coil to apply thereon a voltage of said second polarity, rectifier means coupled to said output of said second coil whereby the simultaneous application of said first and second pulses in said first and second coils when said core is in the magnetic residual state of said first polarity will produce as the only output of said rectifier the first polarity portion of said second pulse less the voltage of said second polarity applied to said output of said second coil, and means coupled to at least a third one of said coils to apply a pulse of said second polarity in said third coil to drive said core to the magnetic saturation state of said second polarity.

3. A magnetic switching circuit having a substantially infinite signal-to-noise ratio comprising a core of magnetically permeable material having substantially rectangular hysteresis loop properties, a plurality of coils inductively coupled to said core, means coupled to at least one of said coils to apply a first pulse of a first polarity to said coil to drive said core to the magnetic saturation state of said first polarity, means coupled to at least a second one of said coils to apply a second pulse of a second polarity to said second coil to drive said core to the magnetic saturation state of said second polarity, means coupled to at least a third one of said coils to apply a third pulse containing voltages of said first and second polarities, means coupled to the output of said third coil to apply thereon a voltage of said second polarity, rectifier means coupled to said output of said third coil whereby simultaneous application of said first and third pulses to said first and third coils when said core is in the magnetic residual state of said first polarity will produce as the only output of said rectifier the first polarity portion of said third pulse less the voltage of said second polarity applied to said output of said third coil and when said core is in the magnetic residual state of said second polarity, said simultaneous application of said first and third pulses to said first and third coils will drive said core to the magnetic saturation state of said first polarity with no signal appearing as the output of said rectifier means.

4. A magnetic switching circuit having a substantially infinite signal-to-noise ratio comprising a core of magnetically permeable material having substantially rectangular hysteresis loop properties, a plurality of coils inductively coupled to said core, means coupled to a first coil to apply a first pulse of a first polarity to said first coil to drive said core to the magnetic saturation state of said first polarity, means coupled to a second coil to apply a second pulse of a second polarity in said second coil to drive said core to the magnetic saturation state of said second polarity, means coupled to a third coil to apply a third pulse containing voltages of said first and second polarities, means coupled to the output of said third coil to apply thereon a voltage of said second polarity, the second polarity voltage of said third pulse being of the same amplitude as the said second polarity voltage applied to said output of said third coil, rectifier means coupled to said output of said third coil whereby the simultaneous generation of said first and third pulses in said first and third coils when said core is in the magnetic residual state of said first polarity will produce as the only output of said rectifier the first polarity portion of said third pulse less the voltage of said second polarity applied to said output of said second coil and when said core is in the magnetic residual state of said second polarity, said simultaneous application of said first and third pulses in said first and third coils will drive said core to the magnetic residual state of said first polarity with no signal appearing as the output of said rectifier means.

References Cited in the file of this patent

UNITED STATES PATENTS

| | | |
|---|---|---|
| 2,751,510 | Bonn | June 19, 1956 |
| 2,766,388 | Wulfing | Oct. 9, 1956 |